United States Patent
Lee et al.

(10) Patent No.: US 11,480,974 B2
(45) Date of Patent: Oct. 25, 2022

(54) TOPOLOGICAL MAP GENERATION APPARATUS FOR NAVIGATION OF ROBOT AND METHOD THEREOF

(71) Applicant: Electronics and Telecommunications Research Institute, Daejeon (KR)

(72) Inventors: Yu-Cheol Lee, Daejeon (KR); Won-Pil Yu, Ulsan (KR); Song Li, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 16/374,033

(22) Filed: Apr. 3, 2019

(65) Prior Publication Data

US 2019/0310653 A1 Oct. 10, 2019

(30) Foreign Application Priority Data

Apr. 5, 2018 (KR) .................. 10-2018-0039782

(51) Int. Cl.
G06F 19/00 (2018.01)
G05D 1/02 (2020.01)
G06T 17/05 (2011.01)

(52) U.S. Cl.
CPC ......... G05D 1/0274 (2013.01); G05D 1/0246 (2013.01); G06T 17/05 (2013.01)

(58) Field of Classification Search
CPC ............... G05D 1/0274; G05D 1/0246; G05D 2201/0216; G05D 1/0238; G06T 17/05; G06T 2210/21; B25J 9/1679; B25J 9/1676; B25J 9/1666; B25J 11/00
See application file for complete search history.

(56) References Cited

U.S. PATENT DOCUMENTS

| 8,234,032 B2* | 7/2012 | Lee ...................... G05D 1/0214 701/25 |
| 8,849,559 B2* | 9/2014 | Jeong .................... G06T 19/003 701/400 |
| 9,026,301 B2 | 5/2015 | Zini et al. |
| 2007/0047940 A1* | 3/2007 | Matsumoto ............. G01S 17/86 396/106 |

(Continued)

FOREIGN PATENT DOCUMENTS

| KR | 100611328 B1 | 8/2006 |
| KR | 1020070060954 A | 6/2007 |

(Continued)

*Primary Examiner* — Harry Y Oh
*Assistant Examiner* — Sohana Tanju Khayer
(74) *Attorney, Agent, or Firm* — William Park & Associates Ltd.

(57) ABSTRACT

Disclosed herein are an apparatus and method for generating a topological map for navigation of a robot. The method for generating a topological map for navigation of a robot, performed by the apparatus for building the topological map for the navigation of the robot, includes calculating the physical size of a single pixel on a metric map of a space in which a mobile robot is to navigate, extracting the physical coordinates of the pixel on the metric map, building node data and edge data for the navigation of the mobile robot using the physical coordinates, and generating a topological map for the navigation of the mobile robot based on the built node data and the built edge data.

8 Claims, 15 Drawing Sheets

(56) References Cited

U.S. PATENT DOCUMENTS

| | | | |
|---|---|---|---|
| 2007/0282531 A1* | 12/2007 | Park | G05D 1/0253 |
| | | | 701/301 |
| 2008/0294338 A1 | 11/2008 | Doh et al. | |
| 2010/0121488 A1* | 5/2010 | Lee | G05D 1/024 |
| | | | 700/245 |
| 2011/0098874 A1* | 4/2011 | Choi | B25J 9/1664 |
| | | | 701/26 |
| 2011/0137461 A1* | 6/2011 | Kong | G05D 1/0225 |
| | | | 700/253 |
| 2011/0153137 A1 | 6/2011 | Yeom | |
| 2015/0032259 A1* | 1/2015 | Kim | G05D 1/0214 |
| | | | 700/255 |
| 2016/0125612 A1* | 5/2016 | Seki | G06K 9/00798 |
| | | | 382/106 |
| 2017/0131721 A1* | 5/2017 | Kwak | B25J 9/1664 |
| 2017/0329347 A1* | 11/2017 | Passot | G05D 1/0246 |
| 2017/0332868 A1* | 11/2017 | Nam | A47L 9/04 |
| 2018/0084708 A1* | 3/2018 | Neitemeier | G06T 7/0004 |
| 2018/0149482 A1* | 5/2018 | Guo | G01C 21/20 |
| 2018/0222486 A1* | 8/2018 | Schroeder | G08G 1/00 |
| 2018/0304468 A1* | 10/2018 | Holz | G06T 7/13 |
| 2018/0364349 A1* | 12/2018 | Kudrynski | G01C 21/367 |
| 2020/0097006 A1* | 3/2020 | Liu | G05D 1/0088 |
| 2021/0116911 A1* | 4/2021 | Pjevach | B60L 50/64 |
| 2021/0129335 A1* | 5/2021 | Liss | B25J 11/0085 |

FOREIGN PATENT DOCUMENTS

| | | |
|---|---|---|
| KR | 100917756 B1 | 9/2009 |
| KR | 101081495 B1 | 11/2011 |
| KR | 101633889 B1 | 6/2016 |

\* cited by examiner

```
<grid_map resolution="0.05" num_cells_x="1504" num_cells_y="488" id="Default_MapID">
  <offset offset_x="0" offset_y="0" theta="0"/>
  <filename>SampleMap.png</filename>
</grid_map>
```

FIG. 5

```xml
<topological_map>
    <nodes>
        <node id="320.75' property_num="3">
            <location x="16' y="3.799999999999998'/>
            <properties>
                <property>
                    <name>zone</name>
                    <value>1</value>
                    <typename>int</typename>
                </property>
                <property>
                    <name>VTagID</name>
                    <value>V_320.75</value>
                    <typename>string</typename>
                </property>
                <property>
                    <name>StopTime</name>
                    <value>30</value>
                    <typename>second</typename>
                </property>
                <property>
                    <name>Service</name>
                    <value>Charginging_Station</value>
                    <typename>string</typename>
                </property>
            <properties>
            <connected_edges>
                <edge_id>320.75_500.75</edge_id>
                <edge_id>320.75_500.75</edge_id>
            </connected_edges>
        </node>
    </nodes>
```

FIG. 8

```
<edges>
    <edge id="1240,310_12240,350" property_num="3" head_node="1230,310" tail_node="124,350">
        <properties>
            <property>
                <name>Distance</name>
                <value>2.000000</value>
                <typename>double</typename>
            </property>
            <property>
                <name>Orientation</name>
                <value>1.570796</value>
                <typename>double</typename>
            </property>
            <property>
                <name>Velocity</name>
                <value>0.000000</value>
                <typename>double</typename>
            </property>
        </properties>
    </edge>
</edges>
</edges>
<topological_map>
```

FIG. 9

```
<kinematic width="1.60" height="0.85">
    <motion safety_margin="30" fixed_body="0" omni_direction="0" orientation="0"/>
<kinematic>
```

FIG. 11

| | | Node Check | Edge Check |
|---|---|---|---|
| CASE 1 | | | |
| CASE 2 | | | |
| CASE 3 | | N/A | |

FIG. 12

Edge Check 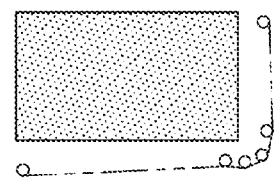 Update Node & Edge Check
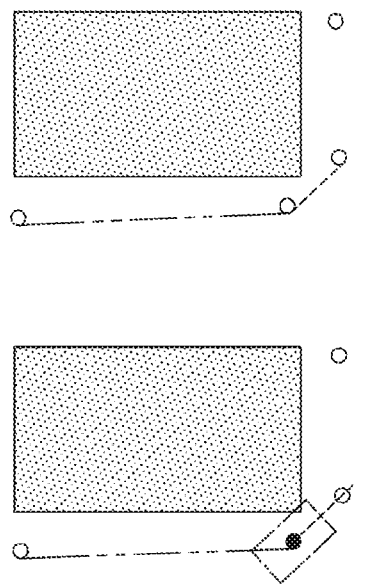
FIG. 15

TOPOLOGICAL MAP GENERATION APPARATUS FOR NAVIGATION OF ROBOT AND METHOD THEREOF

CROSS REFERENCE TO RELATED APPLICATION

This application claims the benefit of Korean Patent Application No. 10-2018-0039782, filed Apr. 5, 2018, which is hereby incorporated by reference in its entirety into this application.

BACKGROUND OF THE INVENTION

1. Technical Field

The present invention relates generally to technology for generating a topological map for the navigation of a robot, and more particularly to technology for generating a topological map for the navigation of a robot in order to represent the structure of a space in which a robot is to travel and a path along which the robot is able to travel.

2. Description of the Related Art

Recently, with the development of robot technology and artificial intelligence (AI) technology, mobile robots are used in various fields. In the case of a task that is difficult to perform using a single robot or a time-consuming task, such as transporting goods from a warehouse to a cargo box, surveilling a large area, or the like, multi-robot technology, in which multiple robots perform a task by sharing the same therebetween is commonly used.

Here, in order to enable multiple robots to seamlessly collaborate with each other, a map that represents information about the structure of a workspace, information about paths along which robots are able to travel, information about fixed obstacles, tasks assigned to robots, and the like is required.

In a robot navigation method, a metric map and a topological map may be used. The metric map, which has a standard for representing the structure of a space, may be categorized into a grid map and a geometric map. The metric map includes important information for implementing robot navigation, that is, for enabling a robot to recognize a space, to estimate a location, to create an optimum path, and the like.

In the case of a map used for the navigation of multiple robots, it is necessary to use simple map representation and to include semantic information for conciseness of information to be shared and provision of various services. Accordingly, a topological map is most commonly used for the navigation of multiple robots.

As a representative example of the use of a topological map, there is a vehicle navigation system. The vehicle navigation system uses a topological map having a simple structure in order to quickly generate a route to a given destination in a large area.

In the vehicle navigation field, there are metric maps, such as satellite pictures, layouts, and the like, through which the precise shape of space is understood, on the basis of which a topological map may be used. In other words, a topological map that can be used for vehicle navigation may be generated in advance using metric maps about a large area in which vehicles travel, and may be used.

In order to use a topological map in the multi-robot service field, it is required to set and generate a standard for a topological map in advance. However, unlike vehicles that travel outdoors, multiple robots are commonly used indoors, for example, in factories, hospitals, offices, and the like. Therefore, there is no metric map available, excluding blueprints.

Accordingly, it is necessary to develop technology for generating a topological map that may be used for the navigation of a robot using a floorplan of an indoor space.

In connection with this, Korean Patent No. 10-1081495 discloses a technology related to "Mapping method for hybrid map of mobile robot".

SUMMARY OF THE INVENTION

An object of the present invention is to generate a topological map based on a metric map that represents a space in order to enable a mobile robot to safely navigate in an indoor space.

Another object of the present invention is to generate a grid map using a floorplan, which is generally provided for an indoor building, and to define the structures of node data and edge data using the grid map.

A further object of the present invention is to classify the locomotion of a mobile robot based on a simple kinematic model, thereby correctly detecting whether a collision with an obstacle occurs at a node and on an edge and providing the mobile robot with a topological map for safe navigation.

Yet another object of the present invention is to generate a topological map to be used for the navigation of a mobile robot using a safe and simple method and to provide the topological map to the mobile robot, thereby expanding mobile robot services in hospitals, warehouses, and the like.

Still another object of the present invention is to increase the benefit of the use of a mobile robot using a topological map for safe navigation of a robot.

Still another object of the present invention is to solve a problem that a map may not be generated depending on the environmental conditions of a space where a robot navigates when a simultaneous localization and mapping (SLAM) method is used for generation of a map.

Still another object of the present invention is to modify the generated path of a mobile robot by checking in advance whether a collision with an obstacle will occur on the generated path.

In order to accomplish the above objects, a method for generating a topological map for the robot navigation, performed by an apparatus for generating the topological map for the robot navigation, according to the present invention includes calculating the physical size of a single pixel on a metric map of a space in which a mobile robot is to navigate; extracting the physical coordinates of the single pixel on the metric map; and building node data and edge data for the navigation of the mobile robot using the physical coordinates and generating a topological map for the navigation of the mobile robot based on the built node data and the built edge data.

Here, generating the topological map may be configured to build the node data pertaining to a node at which the mobile robot performs a navigation service or at which the mobile robot rotates and to build the edge data pertaining to an edge, which is a line connecting two nodes.

Here, the method may further include determining whether a collision occurs on the path of the mobile robot corresponding to the node data and the edge data; and modifying the path of the mobile robot when it is determined that the collision occurs.

Here, determining whether the collision occurs may be configured to select a method for detecting the collision occurrences based on at least one of kinematic information of the mobile robot, obstacle information on the metric map, and the topological map, the kinematic information including at least one of information about whether the orientation of the upper plate of the mobile robot platform is fixed when the mobile robot rotates and information about whether the mobile robot is able to rotate in place.

Here, determining whether the collision occurs may be configured to determine whether the collision occurs at a node and on an edge corresponding to the mobile robot if the orientation of the upper plate of the mobile robot platform is fixed when the mobile robot rotates and if the mobile robot is able to rotate in place.

Here, determining whether the collision occurs may be configured to determine whether the collision occurs at a node and on an edge corresponding to the mobile robot if it is necessary to change the orientation of the upper plate of the mobile robot platform when the mobile robot rotates and if the mobile robot is able to rotate in place.

Here, determining whether the collision occurs may be configured to determine whether the collision occurs on an edge corresponding to the mobile robot if it is necessary to change the orientation of the upper plate of the mobile robot platform when the mobile robot rotates and if the mobile robot is not able to rotate in place.

Here, the method may further include generating a grid map that shows a region in which an obstacle is existed based on the physical size of the single pixel.

Here, determining whether the collision occurs may be configured to determine whether the mobile robot collides with the obstacles using information about the location of the obstacles, which is determined based on the grid map, and motion information of the mobile robot, which is determined based on kinematic information of the mobile robot.

Here, the kinematic information of the mobile robot may include at least one of information about the size of the mobile robot, safety margin information, information about whether the orientation of the upper plate of the mobile robot platform is fixed when the mobile robot rotates, information about whether the mobile robot is able to rotate in place, and information about a direction of movement.

Also, an apparatus for generating a topological map for navigation of a robot according to an embodiment of the present invention includes a physical coordinates extraction unit for calculating the physical size of a single pixel on a metric map of a space in which a mobile robot is to navigate and for extracting the physical coordinates of the single pixel on the metric map; and a topological map generation unit for building node data and edge data for the navigation of the mobile robot using the extracted physical coordinates and building a topological map for the navigation of the mobile robot consists of the built node data and the built edge data.

Here, the topological map generation unit may build the node data pertaining to a node at which the mobile robot performs a navigation service or at which the mobile robot rotates and build the edge data pertaining to an edge, which is a line connecting two nodes.

Here, the apparatus may further include a collision-avoidance unit for determining whether a collision occurs on the path of the mobile robot corresponding to the node data and the edge data and modifying the path of the mobile robot when it is determined that the collision occurs.

Here, the collision-avoidance unit may determine whether the collision occurs based on at least one of kinematic information of the mobile robot, obstacle information on the metric map, and the topological map, the kinematic information including at least one of information about whether the orientation of the upper plate of the mobile robot platform is fixed when the mobile robot rotates and information about whether the mobile robot is able to rotate in place.

Here, the collision-avoidance unit may determine whether the collision occurs at a node and on an edge corresponding to the mobile robot if the orientation of the upper plate of the mobile robot platform is fixed when the mobile robot rotates and if the mobile robot is able to rotate in place.

Here, the collision-avoidance unit may determine whether the collision occurs at a node and on an edge corresponding to the mobile robot if it is necessary to change the orientation of the upper plate of the mobile robot platform when the mobile robot rotates and if the mobile robot is able to rotate in place.

Here, the collision-avoidance unit may determine whether the collision occurs on an edge corresponding to the mobile robot if it is necessary to change the orientation of the upper plate of the mobile robot platform when the mobile robot rotates and if the mobile robot is not able to rotate in place.

Here, the physical coordinates extraction unit may generate a grid map that shows a region where an obstacle is existed in the space based on the physical size of the single pixel.

Here, the collision-avoidance unit may determine whether the mobile robot collides with the obstacle using information about the location of the obstacle, which is determined based on the grid map, and motion information of the mobile robot, which is determined based on kinematic information of the mobile robot.

Here, the kinematic information of the mobile robot may include at least one of information about the size of the mobile robot, safety margin information, information about whether the orientation of the upper plate of the mobile robot platform is fixed when the mobile robot rotates, information about whether the mobile robot is able to rotate in place, and information about a direction of movement.

BRIEF DESCRIPTION OF THE DRAWINGS

The above and other objects, features and advantages of the present invention will be more clearly understood from the following detailed description taken in conjunction with the accompanying drawings, in which:

FIG. 5 is an exemplary view in which information about a grid map is represented as XML data according to an embodiment of the present invention;

FIG. 8 is an exemplary view in which information about a node on a topological map is represented as XML data according to an embodiment of the present invention;

FIG. 9 is an exemplary view in which information about an edge on a topological map is represented as XML data according to an embodiment of the present invention;

FIG. 11 is an exemplary view in which kinematic information is represented as XML data according to an embodiment of the present invention:

FIG. 12 is a view that shows the types of collision check methods according to an embodiment of the present invention:

FIG. 15 is a view for explaining a third collision check method according to an embodiment of the present invention.

DESCRIPTION OF THE PREFERRED EMBODIMENTS

Figure 1:
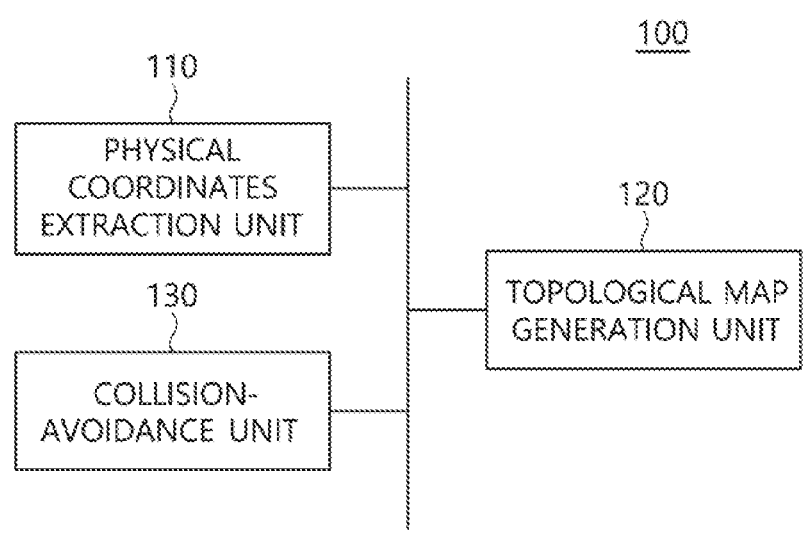
FIG. 1 is a block diagram that shows the configuration of an apparatus for generating a topological map for navigation of a robot according to an embodiment of the present invention.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a preferred embodiment of the present invention will be described in detail with reference to the accompanying drawings. In the following description of the present invention, the same reference numerals are used to designate the same or similar elements throughout the drawings, and repeated descriptions of the same components will be omitted.

FIG. 1 is a block diagram that shows the configuration of an apparatus for generating a topological map for navigation of a robot according to an embodiment of the present invention.

As illustrated in FIG. 1, the apparatus 100 for generating a topological map for navigation of a robot according to an embodiment of the present invention includes a physical coordinates extraction unit 110, a topological map generation unit 120, and a collision-avoidance unit 130.

First, the physical coordinates extraction unit 110 calculates the physical size of a single pixel on a metric map of a space in which a mobile robot is to navigate. Then, the physical coordinates extraction unit 110 extracts the physical coordinates of the pixel on the metric map.

The apparatus 100 for generating a topological map for navigation of a robot according to an embodiment of the present invention may use a floorplan in order to obtain a metric map of an indoor space in which a mobile robot is to navigate. A floorplan is generally provided as an image represented as pixels, and the physical sizes of structures are written on the floorplan, but the physical size of a single pixel on the image is not written thereon.

Accordingly, after it reads the image of a floorplan, the physical coordinates extraction unit 110 according to an embodiment of the present invention may calculate the physical size of a single pixel on the image using information about an arbitrary line, the size of which is illustrated.

Also, the physical coordinates extraction unit 110 may generate a grid map, which shows a region in which an obstacle is placed in the space, based on the physical size of a single pixel. The grid map includes essential information through which the image coordinates of a floorplan may be converted into size information. Here, the essential information may include at least one of resolution information, the number of pixels, the identifier of the grid map, offset information, and the image file name of the grid map. The topological map generation unit 120, which will be described later, may generate a topological map from the grid map using the essential information of the grid map.

Also, the physical coordinates extraction unit 110 may generate a grid map from a floorplan by representing a region in which an obstacle is present in a black color and representing a area in which any obstacles are not present in a white color in order to easily represent the locations of obstacles.

The topological map generation unit 120 builds node data and edge data for the navigation of a mobile robot using the extracted physical coordinates. The topological map generation unit 120 may build node data pertaining to a node and edge data pertaining to an edge. On a topological map, a 'node' may be a point at which a certain service of a mobile robot is performed or at which the mobile robot rotates, and an 'edge' may be a line that connects two nodes.

The node data may include at least one of the identifier of a node, information about the physical location of the node, information about the identifier of an edge that starts from the corresponding node, and the number of properties of the node. The properties of a node may include at least one of information about the zone in which the node is located, information about an RFID tag installed at the location of the node, information about a time period during which a robot stays at the location of the node, and service information corresponding to the node.

The edge data may include at least one of the identifier of an edge, properties thereof, information about the head node thereof, and information about the tail node thereof. The properties of an edge may include at least one of information about the length of the edge, information about the orientation thereof, and information about the permissible maximum velocity of movement along the edge.

Also, the topological map generation unit 120 builds a topological map for the navigation of a mobile robot based on the built node data and built edge data.

The collision-avoidance unit 130 determines whether a collision occurs on the path of a mobile robot corresponding to the node data and the edge data. When it determines that a collision occurs, the collision-avoidance unit 130 may modify the path of the mobile robot.

Here, the collision-avoidance unit 130 may select a determination method for determining whether a collision occurs based on the kinematic information of the mobile robot and obstacle information on a metric map. Here the kinematic information includes at least one of information about whether the orientation of the upper plate of the mobile robot platform is fixed when the mobile robot rotates and information about whether the mobile robot is able to rotate in place.

Here, the determination method may be selected from among three methods. If the orientation of the upper plate of a mobile robot platform is fixed when the mobile robot rotates and if the mobile robot is able to rotate in place, whether a collision occurs may be determined using a first determination method. If it is necessary to change the orientation of the upper plate of a mobile robot platform when the mobile robot rotates and if the mobile robot is able to rotate in place, whether a collision occurs may be determined using a second determination method. If it is necessary to change the orientation of the upper plate of a mobile robot platform when the mobile robot rotates and if the mobile robot is not able to rotate in place, whether a collision occurs may be determined using a third determination method.

Here, the first and second determination methods are approaches for determining whether a collision occurs at a node and on an edge corresponding to a mobile robot. The third determination method is an approach for determining whether a collision occurs on an edge corresponding to a mobile robot.

Also, the collision-avoidance unit 130 may determine whether a mobile robot collides with an obstacle using information about the location of the obstacle, which is determined based on the grid map, and the motion information of the mobile robot, which is determined based on the kinematic information of the mobile robot.

Here, the kinematic information of the mobile robot may include at least one of information about the size of the mobile robot, safety margin information, information about whether the orientation of the upper plate of the mobile robot platform is fixed when the mobile robot rotates, information about whether the mobile robot is able to rotate in place, and information about a direction of movement.

Hereinafter, a method for generating a topological map for navigation of a robot, performed by an apparatus for generating a topological map for navigation of a robot, according to an embodiment of the present invention will be described in detail with reference to FIGS. 2 to 11.

Figure 2:
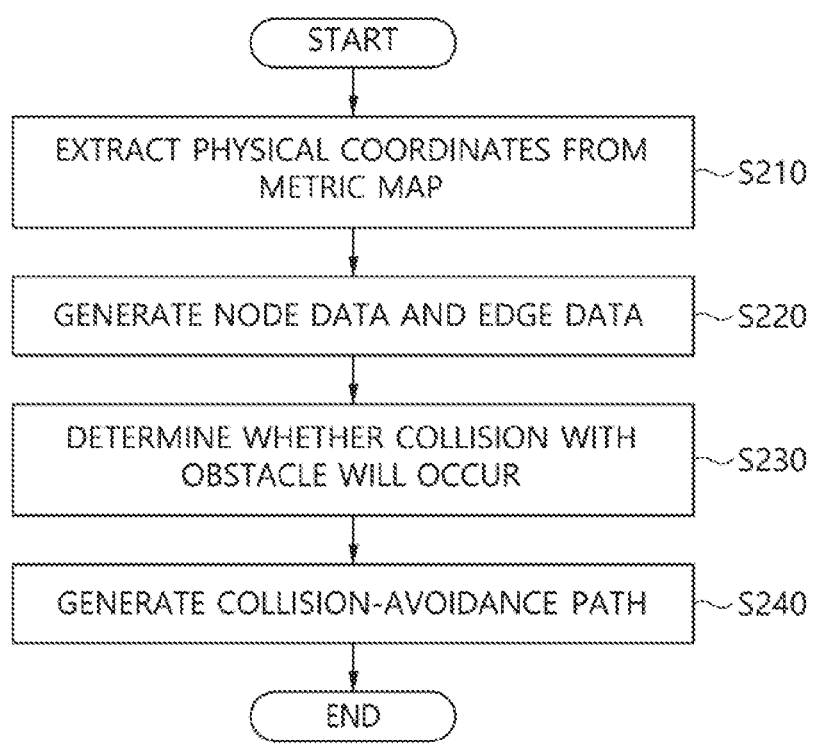
FIG. 2 is a flowchart for explaining a method for generating a topological map for navigation of a robot according to an embodiment of the present invention.

FIG. 2 is a flowchart for explaining a method for generating a topological map for navigation of a robot according to an embodiment of the present invention.

First, the apparatus 100 for generating a topological map for navigation of a robot extracts physical coordinates from a metric map at step S210.

The apparatus 100 for generating a topological map for navigation of a robot may calculate the physical size of a single pixel on the image of a floorplan and generate a topological map that shows physical coordinates using the physical size of the single pixel.

Figure 3:
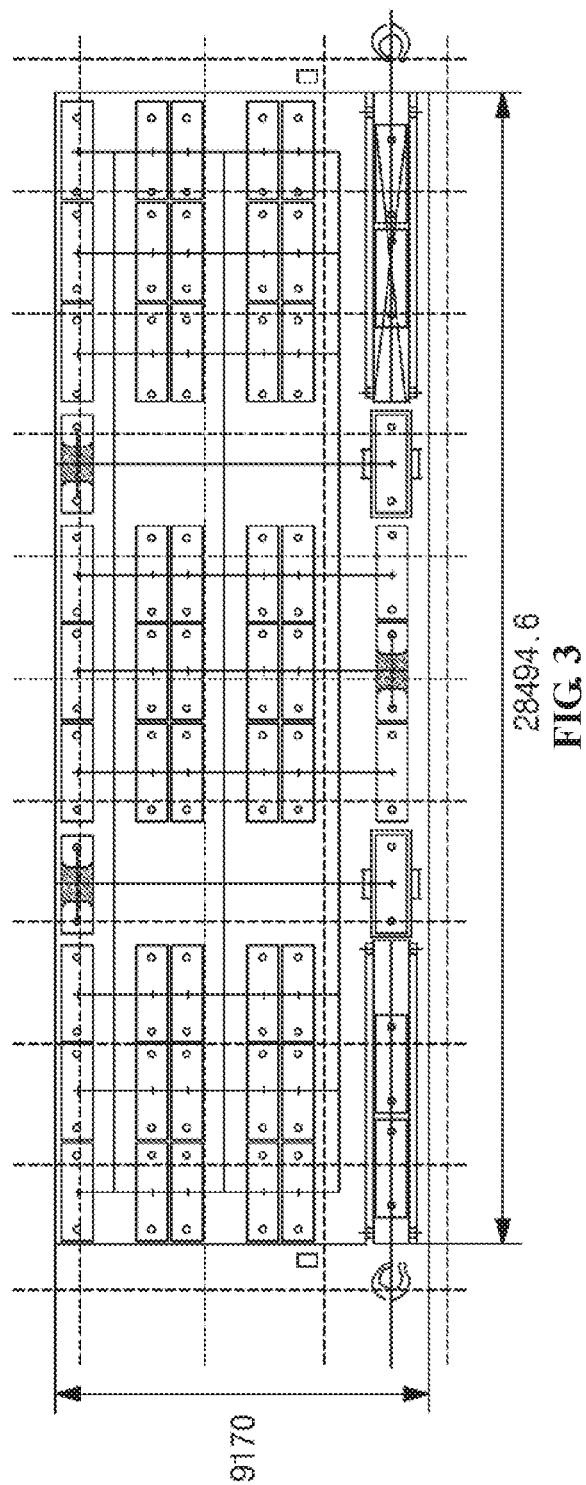
FIG. 3 is an exemplary view that shows an example of a floorplan according to an embodiment of the present invention.

FIG. 3 is an exemplary view that shows an example of a floorplan according to an embodiment of the present invention.

In FIG. 3, the apparatus 100 for generating a topological map for navigation of a robot calculates the length of an arbitrary line segment (distance) illustrated in a floorplan and counts the number of pixels (pixel_count) corresponding to the line segment. Then, the apparatus 100 for generating a topological map for navigation of a robot divides the length of the line segment (distance) by the number of pixels (pixel_count), thereby calculating the resolution information of the floorplan. Here, the resolution information means the physical size of a single pixel.

Figure 4:
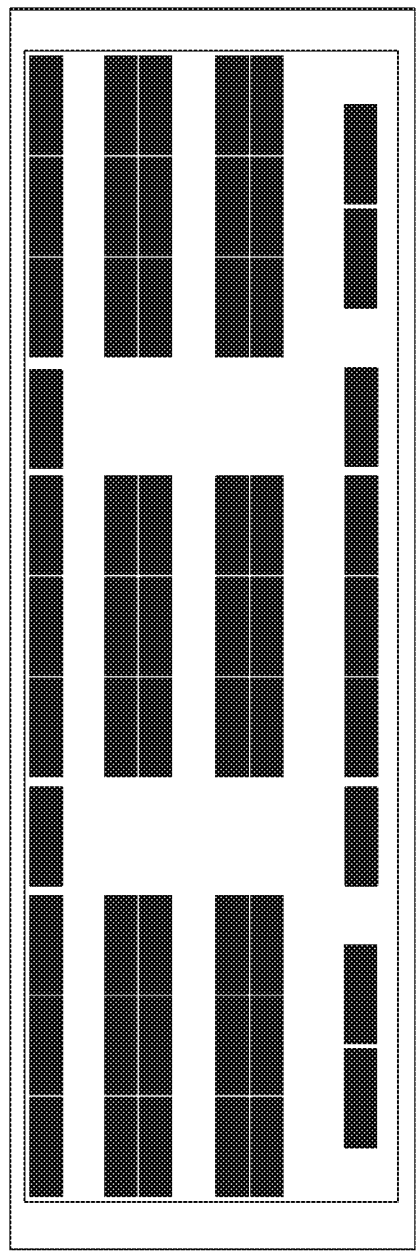
FIG. 4 is an exemplary view that shows an example of a grid map generated based on a floorplan according to an embodiment of the present invention.

FIG. 4 is an exemplary view that shows an example of a grid map generated from a floorplan according to an embodiment of the present invention.

In order to easily represent the locations of obstacles in a space, the apparatus 100 for generating a topological map for navigation of a robot may produce a grid map, as shown in FIG. 4. On the grid map, a area in which an obstacle is placed may be represented in a black color, and a area in which any obstacles are located may be represented in a white color.

Figure 6:
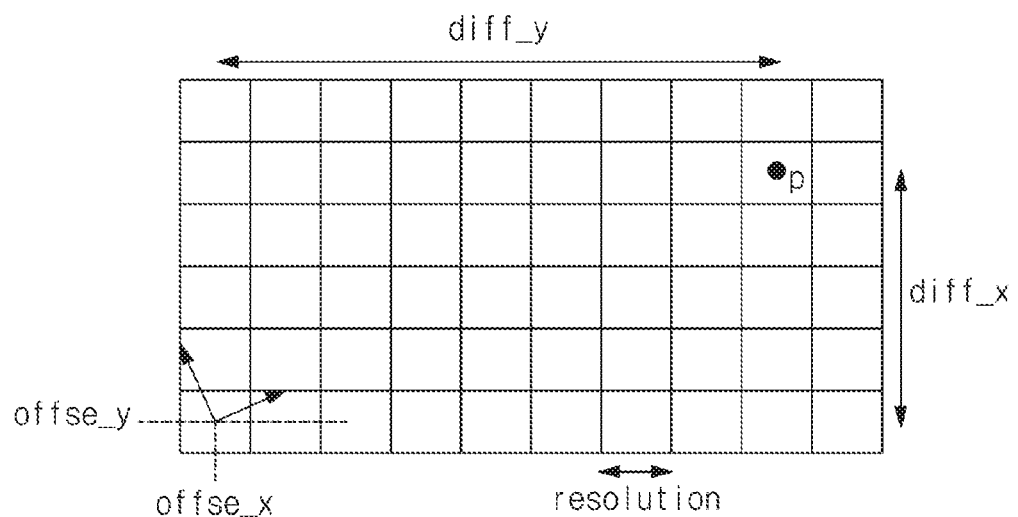
FIG. 6 is an exemplary view for explaining the process of calculating the physical coordinates of a pixel on a grid map according to an embodiment of the present invention.

FIG. 5 is an exemplary view in which information about a grid map is represented as XML data according to an embodiment of the present invention, and FIG. 6 is an exemplary view for explaining the process of calculating the physical coordinates of an arbitrary pixel on a grid map according to an embodiment of the present invention.

As shown in FIG. 5, the essential information of a grid map may include at least one of resolution information (resolution), the number of pixels (num_cell), the identifier of the grid map (id), offset information (offset), and the image file name of the grid map (filename).

In FIG. 5 and FIG. 6, 'resolution' denotes the physical size of a single pixel, and may be in units of meters. Also, 'num_cell_x' and 'num_cell_y' denote the number of pixels corresponding to the width and length of the grid map, respectively, and they may be in units of pixels.

Also, 'id', which is the identifier of a grid map, is for identifying the grid map from other grid maps, and may be represented as a string. Also, 'offset' may denote an origin point, which is necessary in order to convert pixel coordinates into physical coordinates. Here, 'offset_x' denotes the physical location of the pixel 0 on the x-axis, which is the leftmost pixel on the horizontal axis of a grid map, and 'offset_y' denotes the physical location of the pixel 0 on the y-axis, which is the bottommost pixel on the vertical axis of the grid map. Also, 'theta' denotes an angle that increases in the counterclockwise direction on the grid map, and may be in units of radians.

In FIG. 6, the location of the pixel 'p' in the physical coordinate may be calculated as shown in the following Equation (1):

$$p\_x = \text{offset}\_x + \text{diff}\_x * \text{resolution} * \cos(\theta) - \text{diff}\_y * \text{resolution} * \sin(\theta)$$

$$p\_y = \text{offset}\_y + \text{diff}\_x * \text{resolution} * \sin(\theta) - \text{diff}\_y * \text{resolution} * \cos(\theta) \quad (1)$$

In Equation (1), p_x, p_y, offset_x, offset_y and resolution are in units of meters, theta (θ) is an angle in units of radians, and diff_x and diff_y denote a horizontal distance and a vertical distance from the pixel (0, 0), which is the bottom left pixel on the grid map.

A grid map is a format in which a space is partitioned into square regions having the same size and whether a space corresponding to each square region is empty or occupied by an object is represented using a defined value. The grid map may represent objects and structures in various shapes.

Accordingly, in order to generate a topological map including nodes and edges for representing the navigation path of a mobile robot, the apparatus 100 for generating a topological map for navigation of a robot according to an embodiment of the present invention may build a grid map that contains essential information based on which image coordinates may be converted into size information before the generation of the topological map.

Subsequently, the apparatus 100 for generating a topological map for navigation of a robot builds node data and edge data at step S220.

The apparatus 100 for generating a topological map for navigation of a robot may generate a topological map that shows physical coordinates using the physical size of a single pixel. That is, the apparatus 100 for generating a topological map for navigation of a robot may define the representation format of node data and edge data, which are the basic units of a topological map, using the grid map, and may generate a topological map that includes nodes and edges for representing the movable path of a mobile robot.

Figure 7:
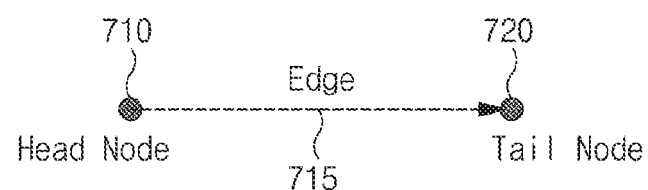
FIG. 7 is a view that shows a node and an edge according to an embodiment of the present invention.

FIG. 7 is a view that shows a node and an edge according to an embodiment of the present invention.

As shown in FIG. 7, a topological map is configured with nodes 710 and 720 and an edge 715. Here, the nodes 710 and 720 are main waypoints for the navigation of a mobile robot, and the edge 715 is a line that connects the head node 710 and the tail node 720.

Also, the apparatus 100 for generating a topological map for navigation of a robot may build node data pertaining to the node and edge data pertaining to the edge, which connects two nodes, thereby generating a topological map.

FIG. 8 is an exemplary view in which information about a node on a topological map is represented as XML data according to an embodiment of the present invention.

As shown in FIG. 8, node data may include at least one of the identifier of a node (id), information about the physical location thereof (location), information about edges that start from the node (connected_edges), properties of the node (properties), and the number of properties of the node (property_num).

The properties of a node (properties) may include at least one of information about the zone in which the node is located (Zone), information about an RFID tag installed at the location of the node (TagID), information about a time period during which a robot stays at the location of the node (StopTime), and service information corresponding to the node (Service).

The identifier of a node (id) is an unique name for differentiating the node from other nodes, and may be defined using a pixel corresponding to the location on a grid map. For example, the identifier of a node may be defined as "x-coordinate.y-coordinate", or the like, and the type thereof may be a string. The physical location of a node (location) is the location of the node on the x-axis and the y-axis, and the values thereof may be in units of meters.

The information about edges, each of which starts from the corresponding node (connected_edges), indicates the identifiers of edges, the head node of which is set to the corresponding node, and may include the identifiers of one or more edges. Here, the type thereof may be a string. Also, the information about edges, each of which starts from the corresponding node (connected_edges), may include information about an edge that is connected with the movable path of a mobile robot at the corresponding node, and may be used to plan the suitable path of the mobile robot.

The number of properties of a node (property_num) is the number of properties (properties) included in the node, and may be varied depending on application extension. Here, the properties of the node (properties) may be a group of as many properties as the value of 'property_num', and may be extended depending on the application for navigation of a robot.

The properties of a node (properties) may include at least one of a zone number (Zone) corresponding to the zone in which the node is located, information about an RFID tag installed at the location of the node (TagID), a time period during which a mobile robot is required to wait when it arrives at the corresponding node (StopTime), and a service to be performed at the node (Service).

When a mobile robot navigates in a very large area, nodes installed in the space may be divided depending on zones. Here, the type of a zone number (Zone) may be a number. Also, the tag information (TagID) and the service information (Service) may be represented as strings, and the stop time period (StopTime) may be in unit of seconds.

Also, in the case of logistics service, the value of the service corresponding to a node (Service) may be at least one of 'Pick_up', 'Drop_Down'. 'Localization', and 'Charging_Station', and the type of service may be set differently depending on the type or purpose of a mobile robot.

FIG. 9 is an exemplary view in which information about an edge on a topological map is represented as XML data according to an embodiment of the present invention.

As shown in FIG. 9, edge data may include at least one of the identifier of an edge (id), information about the head node thereof (head_node), information about the tail node thereof (tail_node), the properties thereof (properties), and the number of properties of the edge (property_num). The properties of the edge (properties) may include at least one of information about the length of the edge (Distance), information about the orientation thereof (Orientation), and information about the permissible maximum velocity of movement along the edge (Velocity).

The identifier of an edge (id) is an unique name for differentiating the edge from other edges, and may be defined as "head-node-id_tail-node-id", or the like by connecting the identifier of the head node thereof with the identifier of the tail node thereof. Here, the identifier of the edge (id) is represented as a string.

The head node information (head_node) may be the identifier of the head node of the corresponding edge, and the tail node information (tail_node) may be the identifier of the tail node thereof.

Also, the properties of the edge (properties) are additional information selected depending on the number of properties, and may include at least one of length information (Distance), which is the physical length of the edge, orientation information (Orientation), which is the orientation of the edge in the global coordinate system, and the maximum velocity of movement (Velocity), which is the allowable speed at which a mobile robot actually moves along the edge. The properties of the edge may be extended according to need in the application.

Referring to FIG. 2 again, the apparatus 100 for generating a topological map for navigation of a robot determines at step S230 whether a collision with an obstacle occurs and generates a collision-avoidance path (safe path) based on the determination result at step S240.

If the apparatus 100 for generating a topological map for navigation of a robot builds node data and edge data pertaining to nodes and edges, which are the basic units on a topological map, without consideration of the locations of obstacles in the space or the motion control of a mobile robot, the robot may collide with an obstacle while it moves in the actual environment.

Accordingly, when it builds node data and edge data, the apparatus 100 for generating a topological map for navigation of a robot according to an embodiment of the present invention may determine whether the topological information corresponding to a mobile robot conflicts with that corresponding to an obstacle present in a space, generate a safe path based on the determination result, and provide the safe path.

In particular, the apparatus 100 for generating a topological map for navigation of a robot may classify the locomotion of a mobile robot using simple kinematic information and determine whether a collision occurs on the path of the mobile robot based on at least one of the kinematic information of the mobile robot, obstacle information on a metric map (a grid map), and a topological map.

Figure 10:
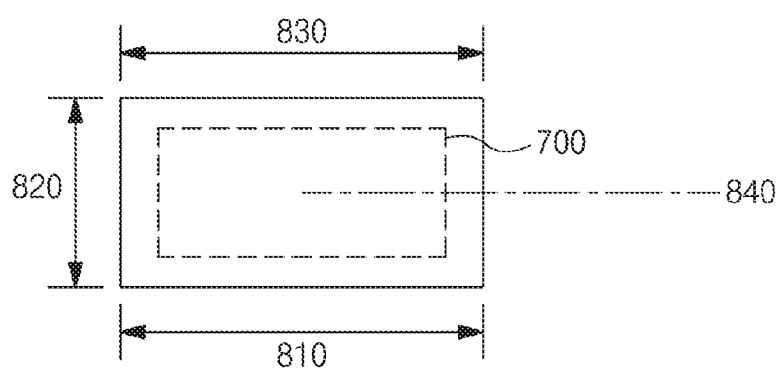
FIG. 10 is a view that shows the meaning of kinematic information according to an embodiment of the present invention.

FIG. 10 is a view that shows the meaning of kinematic information according to an embodiment of the present invention, and FIG. 11 is an exemplary view in which kinematic information is represented as XML data according to an embodiment of the present invention.

As shown in FIG. 10 and FIG. 11, the kinematic information of a mobile robot may include the size information of the mobile robot (width and height) and the motion information thereof (motion). The size information may include the width 810 of the mobile robot (width) and the length 820 thereof (height), and may be in units of meters.

The motion information may include at least one of safety margin information (safety_margin), information about whether the orientation of the upper plate of a mobile robot platform is fixed when the mobile robot rotates (fixed_body), information about whether the mobile robot is able to rotate in place (omni_direction), and information about a direction of movement (orientation). The safety margin information indicates the degree of safety with respect to the size of the mobile robot when whether a collision with an obstacle occurs is checked, and may be represented as a percentage (%).

For example, when the width 810 of a mobile robot 700 is 1.60 m, when the length 820 thereof is 0.85 m, and when the value of safety margin information is 30%, the apparatus 100 for generating a topological map for navigation of a robot according to an embodiment of the present invention sets a width of 2.08 m and a length of 1.105 m as safe sizes 830, thereby conservatively checking whether the mobile robot 700 will collide. Here, the path may be set such that, while it moves, the mobile robot is spaced a greater distance apart from a nearby obstacle as the value of safety margin information is greater.

Also, information about whether or not the orientation of the upper plate of a mobile robot platform is fixed when the mobile robot rotates indicates whether or not the orientation of the upper plate of the mobile robot platform is fixed, and may be set to a Boolean-type value, that is, 0 or 1. Information about whether a mobile robot is able to rotate in place indicates whether a mobile robot is able to rotate in place in all directions, and may be set to a Boolean-type value, that is, 0 or 1. Also, the information about the direction of movement indicates the orientation of the upper plate of the mobile robot platform when the mobile robot moves, and may be a radian value that represents the orientation of the mobile robot.

The apparatus 100 for generating a topological map for navigation of a robot may check whether a collision between a mobile robot and an obstacle occurs using the kinematic information of the mobile robot and obstacle information on a grid map when it builds node data and edge data. In particular, the apparatus 100 for generating a topological map for navigation of a robot may detect the locations of obstacles in a space using the grid map and generate the navigation path and motion information of the mobile robot using the kinematic information.

Also, the apparatus 100 for generating a topological map for navigation of a robot may classify methods for checking whether a collision with an obstacle occurs at a node and on an edge as three methods depending on the locomotion of the mobile robot. Here, the locomotion of the mobile robot may be determined depending on information about whether the orientation of the upper plate of the mobile robot platform is fixed when the mobile robot rotates and information about whether the mobile robot is able to rotate in place.

If the orientation of the upper plate is fixed when the mobile robot rotates and if the mobile robot is able to rotate in place, a first collision check method may be used. If it is necessary to change the orientation of the upper plate when the mobile robot rotates and if the mobile robot is able to rotate in place, a second collision check method may be used. If it is necessary to change the orientation of the upper plate when the mobile robot rotates and if the mobile robot is not able to rotate in place, a third collision check method may be used.

Meanwhile, if the orientation of the upper plate of the mobile robot platform is fixed when the mobile robot rotates and if the mobile robot is not able to rotate in place, physical locomotion may not occur because the mobile robot is not able to rotate in place and the mobile robot is not able to move due to the fixed orientation of the upper plate when the driving unit of the mobile robot is rotated. Therefore, a method for checking whether a collision with an obstacle occurs is not provided for this case.

When it is determined that a mobile robot collides with an obstacle as the result of checking, the apparatus 100 for generating a topological map for navigation of a robot modifies the path. For example, the apparatus 100 for generating a topological map for navigation of a robot determines that the node at which a collision occurs may not be included in the path of the mobile robot when it generates an edge, thus modifying the location of the corresponding node.

Hereinafter, a method for checking whether a collision with an obstacle occurs at a node and on an edge depending on the locomotion of a mobile robot according to an embodiment of the present invention will be described in detail with reference to FIGS. 12 to 15.

FIG. 12 is a view that shows the types of methods for checking whether a collision with an obstacle occurs according to an embodiment of the present invention.

In FIG. 12, 'Case 1' indicates the case in which a mobile robot moves in the state in which the orientation of the upper plate thereof is fixed when the driving unit rotates and in which the driving unit is able to rotate in place in all directions. In this case, whether a collision occurs at a node and on an edge is checked using a first collision check method.

Also, 'Case 2' indicates the case in which the orientation of the upper plate of a mobile robot platform is changed when the driving unit thereof rotates and in which the driving unit is able to rotate in place in all directions. In this case, whether a collision occurs at a node and on an edge is checked using a second collision check method.

Also, 'Case 3' indicates the case in which the orientation of the upper plate of a mobile robot platform is changed when the driving unit thereof rotates and in which the driving unit is not able to rotate in place. In this case, whether a collision occurs on an edge is checked using a third collision check method.

Figure 13:
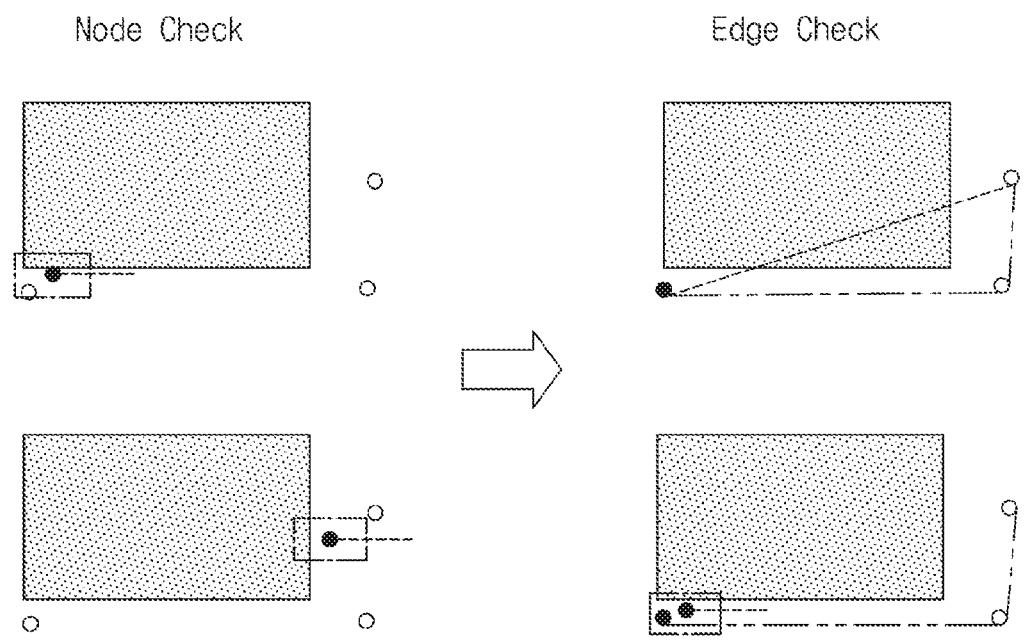
FIG. 13 is a view for explaining a first collision check method according to an embodiment of the present invention.

FIG. 13 is a view for explaining a first collision check method according to an embodiment of the present invention.

Assume that a mobile robot moves in the state in which the orientation of the upper plate thereof is fixed when the mobile robot rotates and that the driving unit thereof is able to rotate in place in all direction. In this case, when the mobile robot stops at a node, the orientation corresponds to the direction of movement (orientation) of the kinematic information. Accordingly, the apparatus 100 for generating a topological map for navigation of a node may perform a collision check at a node (Node Check) only with respect to the corresponding orientation.

Also, when the mobile robot moves along a path that connects a head node and a tail node, because the orientation of the upper plate of thereof is fixed during the movement, the apparatus 100 for generating a topological map for navigation of a robot may perform a collision check on an edge (Edge Check) only with respect to the corresponding orientation.

In 'Case 1', the mobile robot with the fixed orientation may collide with an obstacle, as shown in FIG. 13.

Figure 14:
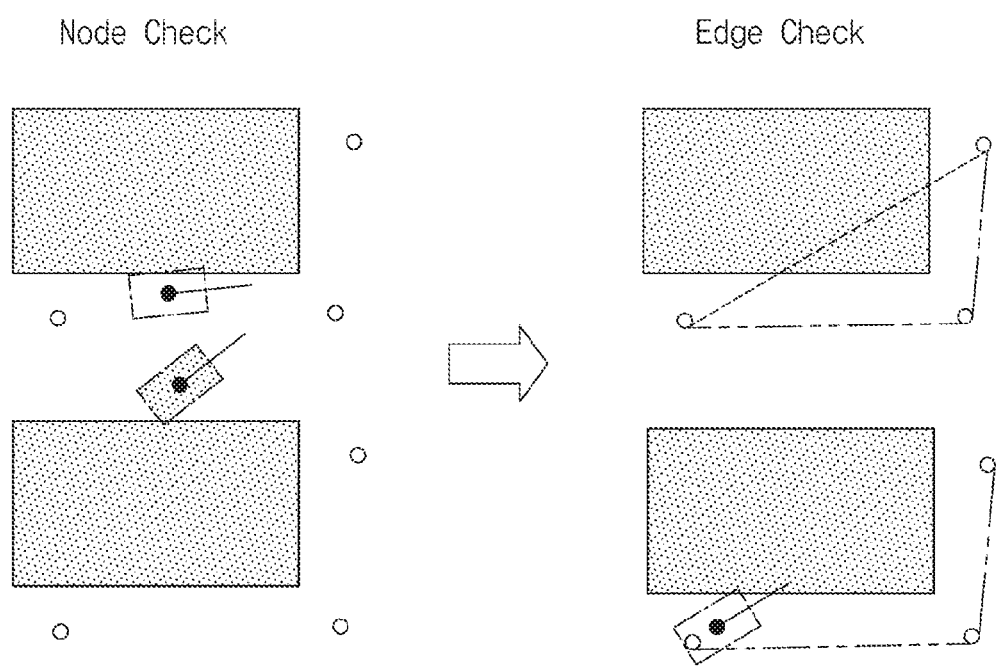
FIG. 14 is a view for explaining a second collision check method according to an embodiment of the present invention.

FIG. 14 is a view for explaining a second collision check method according to an embodiment of the present invention.

If it is necessary to change the orientation of the upper plate of a mobile robot platform when the mobile robot rotates and if the driving unit thereof is able to rotate in place in all directions, the apparatus 100 for generating a topological map for navigation of a robot is required to check whether a collision occurs at nodes and on edges.

When the mobile robot stops at a node, because the orientation thereof at the node varies depending on information about the edge connected with the node, the apparatus 100 for generating a topological map for navigation of a robot checks whether a collision occurs with respect to all angles when the mobile robot rotates.

Also, when the mobile robot moves along an edge, because the mobile robot moves in a fixed direction from the head node of the edge to the tail node thereof, the apparatus 100 for generating a topological map for navigation of a robot checks whether a collision occurs depending on the direction in which the head node and the tail node are connected.

In 'Case 2', when a mobile robot collides with a nearby obstacle at a node or on an edge, the orientation thereof may be different, as shown in FIG. 14. Also, a collision may occur on an edge depending on the direction in which the two nodes (the head node and the tail node) are connected.

FIG. 15 is a view for explaining a third collision check method according to an embodiment of the present invention.

If it is necessary to change the orientation of the upper plate of a mobile robot when the mobile robot rotates and if the driving unit thereof is not able to rotate in place, the apparatus 100 for generating a topological map for navigation of a robot may check whether a collision occurs at an edge. Here, because the mobile robot is not able to rotate in place at any node, whether a collision occurs at a node may not be checked.

When the apparatus 100 for generating a topological map for navigation of a robot generates a node on a topological map, if it determines that a collision occurs on an edge connected to the node, the corresponding node is determined to be unsuitable for the path of the mobile robot. Accordingly, the apparatus 100 for generating a topological map for navigation of a robot may modify the location of the corresponding node.

In 'Case 3', the mobile robot is not able to rotate at a node, and the orientation thereof varies depending on an edge connected to the node when the mobile robot stops at the node. Therefore, whether a collision occurs at the node may be checked by checking whether a collision occurs on the edge. Also, when the mobile robot moves along an edge, because the direction is fixed depending on the head node and the tail node of the edge, whether a collision occurs on the edge may be checked only with respect to the direction while the mobile robot is moving.

In FIG. 15, a collision occurs on the edge, the direction of which is fixed depending on the head node and the tail node of the edge. The node at which a collision occurs is not used for the movable path because the node is connected to the edge, and the apparatus 100 for generating a topological map for navigation of a robot generates a new node, repeatedly check whether a collision occurs on an edge connected to the new node, and generates a path for a mobile robot using nodes and edges at which no collision occurs, thereby generating a topological map for the mobile robot.

Figure 16:
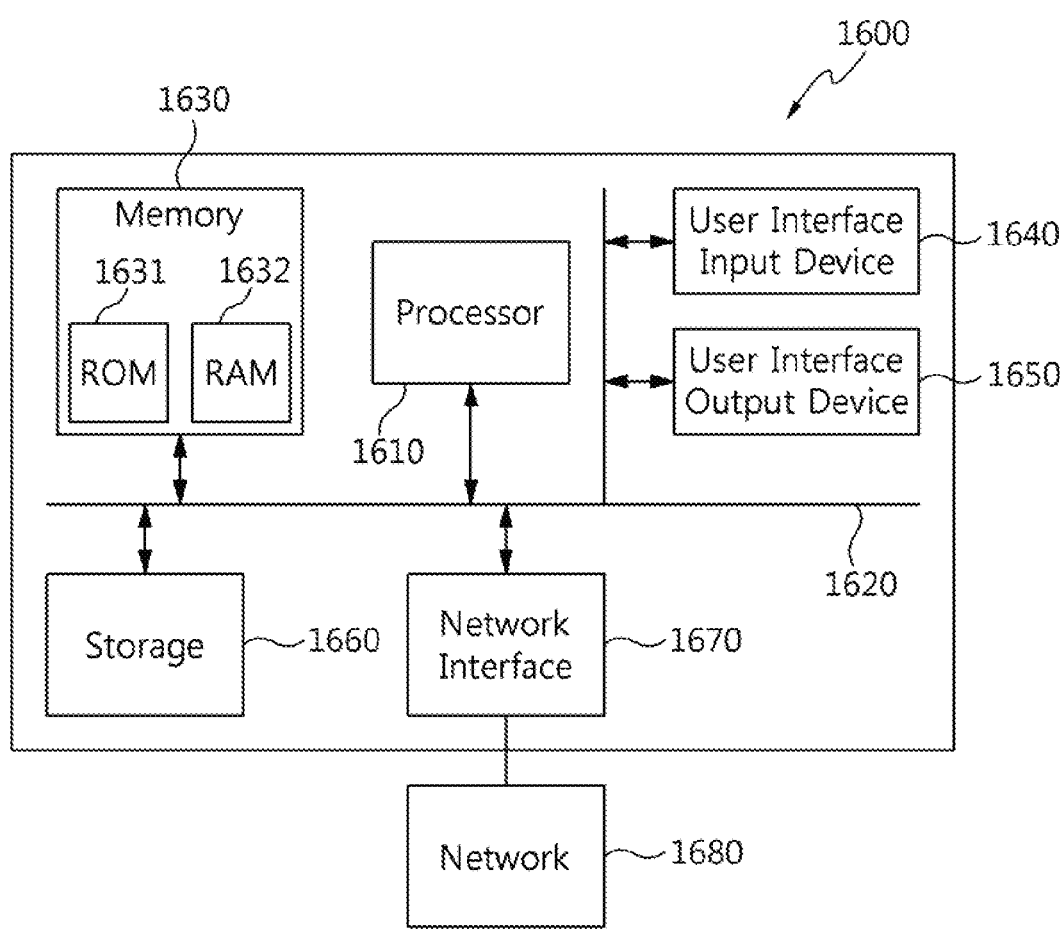
FIG. 16 is a block diagram that shows a computer system according to an embodiment of the present invention.

FIG. 16 is a block diagram that shows a computer system according to an embodiment of the present invention.

Referring to FIG. 16, an embodiment of the present invention may be implemented in a computer system 1600 including a computer-readable recording medium. As illustrated in FIG. 16, the computer system 1600 may include one or more processors 1610, memory 1630, a user-interface input device 1640, a user-interface output device 1650, and storage 1660, which communicate with each other via a bus 1620. Also, the computer system 1600 may further include a network interface 1670 connected to a network 1680. The processor 1610 may be a central processing unit or a semiconductor device for executing processing instructions stored in the memory 1630 or the storage 1660. The memory 1630 and the storage 1660 may be various types of volatile or nonvolatile storage media. For example, the memory may include ROM 1631 or RAM 1632.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, in order to enable a mobile robot to safely navigate in indoors, a topological map may be generated based on a metric map that represents a space.

Also, according to the present invention, a grid map may be generated using a floorplan, which is generally provided for an indoor building, and the structures of node data and edge data may be defined using the grid map.

Also, according to the present invention, the locomotion of a mobile robot is classified based on a simple kinematic model, whereby whether a collision with an obstacle occurs at a node and on an edge may be correctly detected, and a topological map for safe navigation may be provided to the mobile robot.

Also, according to the present invention, a topological map to be used for the navigation of a mobile robot may be generated using a safe and simple method and provided to the mobile robot, whereby mobile robot services may be expanded in hospitals, warehouses, and the like.

Also, according to the present invention, the benefit of the use of a mobile robot may be increased using a topological map for safe navigation of a robot.

Also, according to the present invention, a problem in which it becomes impossible to generate a map depending on the environmental conditions of a space in which a robot is to navigate when a simultaneous localization and mapping (SLAM) method is used for building a map may be solved, and whether a collision with an obstacle will occur on the path of a mobile robot may be checked in advance, whereby the path may be modified when it is determined that a collision occurs.

As described above, the apparatus and method for generating a topological map for navigation of a robot according to the present invention are not limitedly applied to the configurations and operations of the above-described embodiments, but all or some of the embodiments may be selectively combined and configured, so that the embodiments may be modified in various ways.

What is claimed is:

1. A method for generating a topological map for navigation of a robot, performed by an apparatus for building the topological map for the navigation of the robot, comprising:
    calculating a physical size of a single pixel on a metric map of a space in which a mobile robot is to navigate;
    extracting physical coordinates of the single pixel on the metric map;
    building node data and edge data for navigation of the mobile robot using the physical coordinates and building a topological map for the navigation of the mobile robot based on the built node data and the built edge data;
    determining whether a future collision will occur on a path of the mobile robot corresponding to the node data and the edge data; and
    modifying the path of the mobile robot when it is determined that the future collision will occur,
    wherein
    map regions in which an obstacle is present are represented in a first color and map regions in which obstacles are not present are represented in a second color, and
    determining whether the future collision will occur is configured to:
    select a first collision determination method if the mobile robot can rotate in place and move in any direction of the mobile robot,
    select a second collision determination method if the mobile robot can rotate in place and move only in a specific direction of the mobile robot, and
    select a third collision determination method if the mobile robot cannot rotate in place.

2. The method of claim 1, wherein generating the topological map is configured to build the node data pertaining to a node at which the mobile robot performs a service or at which the mobile robot rotates and to build the edge data pertaining to an edge, which is a line connecting two nodes.

3. The method of claim 1, further comprising: generating a grid map that shows the region in which an obstacle is present in the space based on the physical size of the single pixel.

4. The method of claim 3, wherein determining whether the future collision will occur is configured to determine whether the mobile robot collides with the obstacle using information about a location of the obstacle, which is determined based on the grid map, and motion information of the mobile robot, which is determined based on kinematic information of the mobile robot.

5. An apparatus for generating a topological map for navigation of a robot, comprising:
    a physical coordinates extraction unit for calculating a physical size of a single pixel on a metric map of a space in which a mobile robot is to navigate and for extracting physical coordinates of the single pixel on the metric map;
    a topological map generation unit for building node data and edge data for navigation of the mobile robot using the physical coordinates and generating a topological map for the navigation of the mobile robot based on the built node data and the built edge data; and
    a collision-avoidance unit for determining whether a future collision will occur on a path of the mobile robot corresponding to the node data and the edge data and modifying the path of the mobile robot when it is determined that the future collision will occur,
    wherein
    map regions in which an obstacle is present are represented in a first color and map regions in which obstacles are not present are represented in a second color, and
    the collision-avoidance unit selects a first collision determination method if the mobile robot can rotate in place and move in any direction of the mobile robot, selects a second collision determination method if the mobile robot can rotate in place and move only in a specific direction of the mobile robot, and selects a third collision determination method if the mobile robot cannot rotate in place.

6. The apparatus of claim 5, wherein the topological map generation unit builds the node data pertaining to a node at which the mobile robot performs a service or at which the mobile robot rotates and builds the edge data pertaining to an edge, which is a line connecting two nodes.

7. The apparatus of claim 5, wherein the physical coordinates extraction unit generates a grid map that shows the region in which an obstacle is present in the space based on the physical size of the single pixel.

8. The apparatus of claim 7, wherein the collision-avoidance unit determines whether the mobile robot collides with the obstacle using information about a location of the obstacle, which is determined based on the grid map, and motion information of the mobile robot, which is determined based on kinematic information of the mobile robot.

* * * * *